R. E. HELLMUND.
ALTERNATING CURRENT COMMUTATOR MOTOR.
APPLICATION FILED JAN. 5, 1917.
1,374,565.
Patented Apr. 12, 1921.
3 SHEETS—SHEET 1.
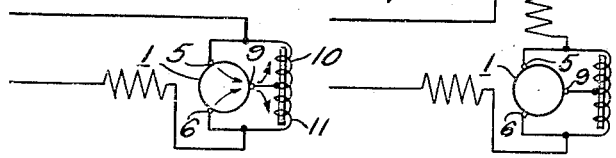
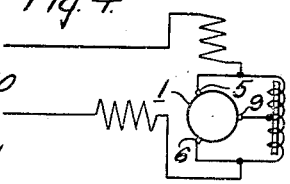
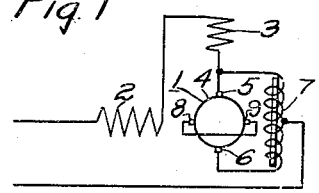
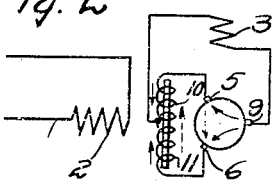
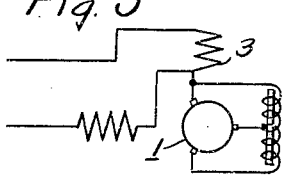
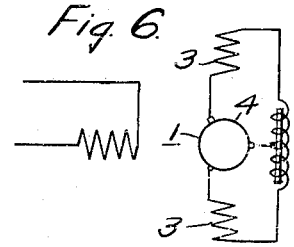
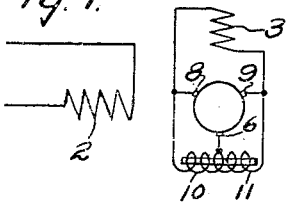
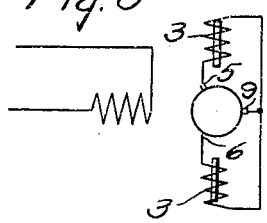
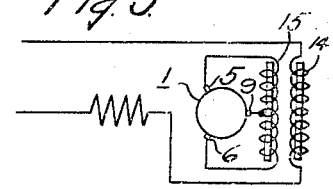
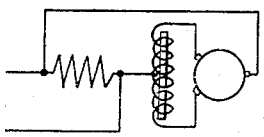
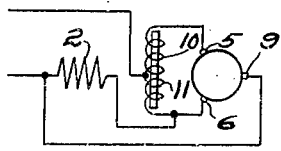
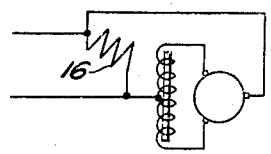
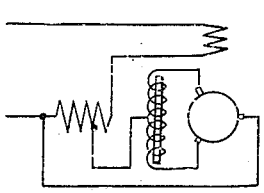
WITNESSES:
William Siler
W. C. McCoy.
INVENTOR
Rudolf E. Hellmund.
BY
Wesley G. Carr
ATTORNEY R. E. HELLMUND.
ALTERNATING CURRENT COMMUTATOR MOTOR.
APPLICATION FILED JAN. 5, 1917.

1,374,565.

Patented Apr. 12, 1921.
3 SHEETS—SHEET 3.

WITNESSES:
William Siler,
W.C. McCoy.

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

ALTERNATING-CURRENT COMMUTATOR-MOTOR.

1,374,565.  Specification of Letters Patent.  Patented Apr. 12, 1921.

Application filed January 5, 1917. Serial No. 140,733.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Alternating-Current Commutator-Motors, of which the following is a specification.

My invention relates to alternating-current commutator motors and particularly to single-phase motors having a commutated rotor winding of the direct-current type and having brushes arranged to provide distinct exterior paths for an armature load current and an armature exciting current.

The object of my invention is to improve the commutation and operating characteristics of motors of the above-designated types.

The class of single-phase commutator motors, to which my invention relates, employs an armature exciting circuit to furnish a portion of the motor-field excitation by reason of the inherently better operating characteristics that may be obtained by employing this form of so-called armature excitation. Among the arrangements that have heretofore been proposed for securing the above-mentioned armature excitation, the most important is the provision of an auxiliary set of exciter brushes which are short-circuited, preferably through an inductive reactor.

In accordance with my invention, I provide an inductive reactor which, in most cases, is connected across the exciting-circuit brushes and which consolidates the functions of the exciting-circuit and the load-circuit brushes by causing the load current circuit brushes by causing the load current to enter the reactor at about the mid point of the reactor winding. Such an arrangement provides a reactor which is effective in opposing the flow of the armature exciting current but which is non-inductive to the armature load current. Furthermore, I propose to provide the reactor with a magnetic circuit which is designed to become magnetically saturated when a predetermined voltage is impressed across the terminals thereof for a purpose to be hereinafter set forth.

Figure 34:
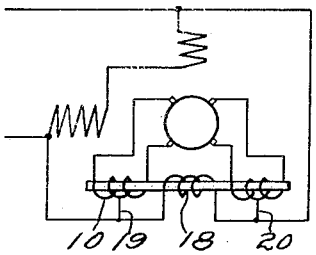
Figure 35:
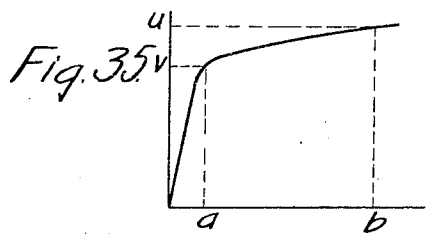

Figures 1 to 34, inclusive, of the accompanying drawings, diagrammatically illustrate my invention as applied to various forms of alternating - current commutator motors; and Fig. 35 shows a characteristic magnetization curve for an inductive reactor.

A more detailed understanding of my invention may be had by referring to the accompanying drawings in which Fig. 1 diagrammatically illustrates an alternating-current commutator motor 1, of a partially armature-excited type, embodying my invention. The motor 1 comprises stator field windings 2 and 3 which are connected in circuit with an armature winding 4 by current-collecting brushes 5 and 6 and an inductively-wound coil or reactor 7. The stator winding 2, which will be hereinafter referred to as the cross-field winding, produces a pulsating magnetic flux which threads the magnetic circuit of the armature along the axis of the armature working circuit 8—9 and causes a current to flow through the armature winding between the brushes 8 and 9 which is nearly in time-phase relation with the voltage impressed upon the cross-field winding 2. The main stator winding 3, or torque-field-producing winding, provides a magnetic flux through the armature which reacts with the current flowing through the armature winding between the brushes 8 and 9 to produce a turning moment tending to rotate the armature. During the process of commutation, the brushes 8 and 9 short-circuit an armature coil, the plane of which is normal to the magnetic axis of the main winding 3. The entire magnetic flux from the main winding 3 will pulsate through the coil thus short-circuited and cause a current of very large magnitude to flow therein. When, however, the armature begins to rotate, an electromotive force is induced in the armature coils between the brushes 8 and 9 by the rotation of the armature inductors in the magnetic field of the winding 3. This induces a rotational electromotive force which tends to oppose the electromotive force set up by transformer action of the exciting winding 3 and may be caused to practically neutralize the same at about full-load operating speed. The electromotive force induced by transformer action in the short-circuited coils is, however, dependent upon the motor current and tends to decrease as the motor speed increases, whereas the rotational electromotive force induced in the short-circuited coil is directly dependent upon the motor speed. Since these two electromotive forces oppose, and vary substantially inversely to each other, the transformer electromotive force will predominate at starting but will gradually be weakened by the rotational electromotive force as the motor speed increases until, at high speeds, the rotational electromotive force will predominate.

If means are not provided for decreasing the current which will be caused to flow in the short-circuited armature coil by the resultant of these electromotive forces, the motor will spark viciously at starting and at high operating speeds. If, however, auxiliary or exciting-circuit brushes 5 and 6 are provided along the magnetic axis of the coil 3, and an auxiliary coil 7 is connected between these brushes, a current may be caused to flow through the coil 7 which will oppose and greatly decrease the magnetizing effect of the main field 3. It is desirable, therefore, to have the winding 7 of small impedance for starting and high operating speeds, and if relatively high impedance for about full-load operating speeds in order that the magnetizing effect of the main field winding 3 may be greatly diminished at starting and high operating speeds and a strong main field be provided for operation under full-load conditions. In order that the reactor 7 may have a relatively high impedance for relatively small impressed voltages and a low impedance for slightly increased voltages, it is necessary to cause the magnetic circuit for the winding to become magnetically saturated for impressed voltages slightly greater than a predetermined value of full-load coil voltage. A winding constituted and connected as described will have slight influence on the operation of the motor at normal running speeds but, at low speeds and at high speeds, the effect will be very pronounced, by reason of the saturation of the magnetic circuit for the reactor 7. This automatic and gradual increase of field strength, as the motor speeds up, gives very desirable characteristics in commutation as well as speed and torque relations. The curve shown in Fig. 35 is a typical magnetization curve for an inductive reactor, such as the coil 7, and is designed to permit a flow of $a$ amperes when a voltage of $v$ volts, corresponding to the coil voltage at starting, is impressed across the terminals of the reactor, and to permit a current of $b$ amperes to flow when a voltage of $u$ volts, corresponding to the coil voltage when the machine is operating at full load, is impressed across the terminals of the coil.

In view of the fact that the work current for alternating-current commutator types of motors is relatively large and that commutation in such motors is essentially poor, it is desirable to use all of the brushes for carrying the work current. Furthermore, the circuit for the work current should contain as small an impedance as may reasonably be provided by consistent design in order that the operating power factor and motor efficiency may be kept large. If the three-brush structure, which is shown in Fig. 2, is employed, the main load current may be caused to flow along the axis of the coil 2 between the brushes 9 and 5 and 9 and 6, as indicated in the figure by the solid-line arrows. If the portions 10 and 11 of the reactor 7 are mutually inductive and are wound in the same direction, the magnetomotive force set up in the portion 10 by the flow of current from the brush 9 to the brush 5 will oppose and neutralize the magnetomotive force set up in the coil 11 by the current flowing from the brush 9 to the brush 6. The magnetizing current will flow from the brush 5 through the armature coil 4 to the brush 6 and through the coil 7 to the brush 5, as indicated by the dotted-line arrows in Fig. 2. This latter current flow produces a magnetic flux along the magnetic axis of the main stator winding 3 and aids or opposes the magnetomotive force of this winding. It will therefore be understood that, with this arrangement, the reactor 7 will not oppose the flow of the work current but will oppose the flow of the armature magnetizing current. The three-brush arrangement, herein described, consolidates the functions of the working and exciting-circuit brushes and renders all of the brushes available for conducting load current. A sufficient number of armature magnetizing turns are provided between the brushes 5 and 6 to give the necessary torque-field strength. The number of effective armature turns may be varied by changing the distance between the brushes 5 and 6. To move the brushes closer together gives a smaller number of magnetizing turns and a larger number of working turns, whereas, separating the brushes 5 and 6 produces the opposite effects. It it not essential that the reactor winding 7 be divided into equal portions 10 and 11 and, in some cases, it may be advisable to adjust the reactor tap in order to secure a desirable distribution of the currents flowing through the respective brush sets or to provide a compensating voltage across certain of the brushes.

Fig. 3 and Fig. 4 show three-brush arrangements in which the work current is conducted through local circuits respectively including brushes 5 and 9 and the portion 10 of the reactor 7, and brushes 6 and 9 and the portion 11 of the reactor. The portions 10 and 11 of the reactor 7 are wound in opposite directions and, since the two circuits are mutually inductive, a substantially short-circuited-current path is provided from the brushes 5 and 6 to the brush 9. The exciting current flows from the brush 5 to the brush 6 and through the inducing field winding 2. The reactor 7 will conduct an increasingly greater proportion of the primary current as the motor speed increases, by reason of the increased voltage across brushes 5 and 6 which will provide a substantially constant-speed motor, as will readily be understood. Fig. 3 is similar to Fig. 4 except that the motor shown in Fig. 4 is partially stator excited. In Fig. 1, substantially one half, or a fixed ratio, of the stator current is conducted across the armature exciting circuit by brushes 5 and 6 which provides armature field excitation that is proportional to the motor load current at starting.

Fig. 2 and Fig. 5 to Fig. 9, inclusive, illustrate forms of alternating-current commutator motors in which all of the armature current is supplied to the armature winding by transformer action. The current paths for these types of motors are the same as those hereinbefore discussed in connection with Fig. 2. Fig. 5 is similar to Fig. 2 except that the main field winding 3 is connected in series-circuit relation with the transformer field 2 instead of being inductively excited through the armature, as in Fig. 2. Fig. 6 illustrates a motor in which the main field winding 3 is divided into two portions, one of which is positioned on each side of the armature and is connected in series-circuit relation with the armature winding 4. Fig. 7 shows a three-brush arrangement in which the load current is conducted from brush 8, through the main field winding 3, to the brush 9 and in which the exciting current flows from the brush 6, through portions 10 and 11 of the reactor 7, to the respective brushes 8 and 9. The arrangement shown in this figure is particularly useful where a small auxiliary brush 6 is employed for conducting only magnetizing current. Fig. 8 illustrates a case in which it is desirable to employ the inductance of the torque-producing winding 3, in lieu of the inductor 7. With this arrangement, the coils 3 are designed to have relatively high magnetic leakage which produces a winding of sufficient inductance to give desirable speed-torque characteristics to the three-brush motor herein shown. Fig. 9 illustrates the use of a primary transformer winding 14 which induces a voltage in the winding 15 which, in turn, is impressed across the brushes 5 and 6. Such an arrangement is particularly useful where power-factor compensation is desired.

Figure 14:
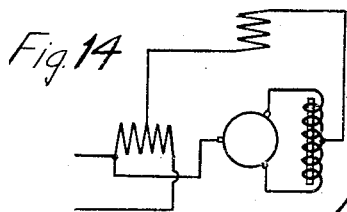
Figure 15:
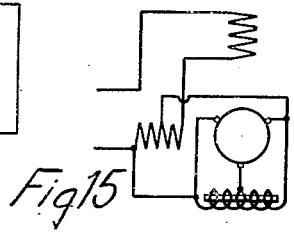
Figure 16:
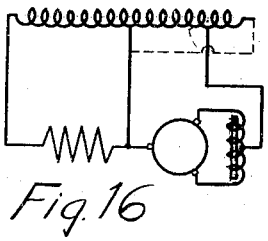
Figure 17:
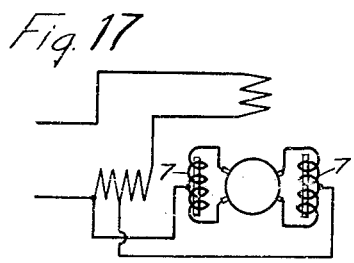
Figure 18:
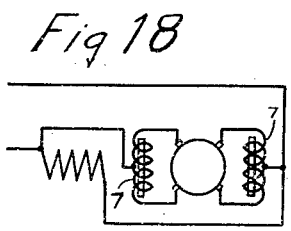
Figure 19:
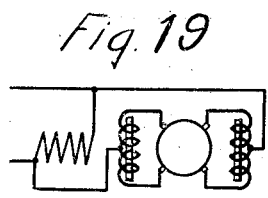
Figure 20:
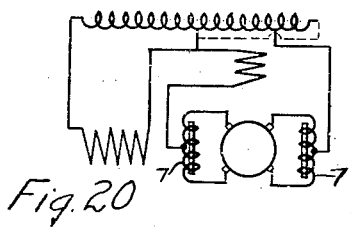
Figure 21:
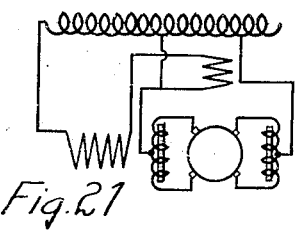
Figure 22:
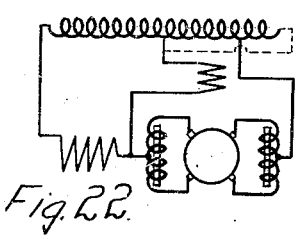
Figure 23:
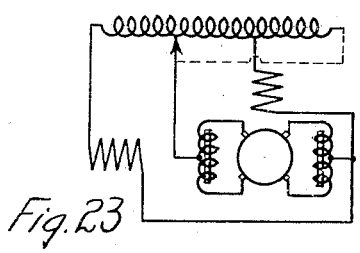
Figure 24:
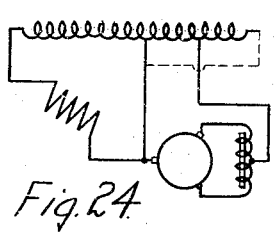
Figure 25:
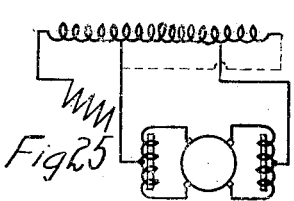
Figure 26:
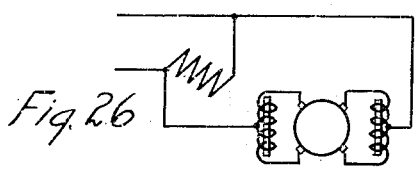
Figure 27:
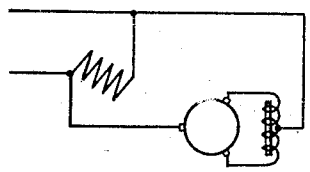
Figure 28:
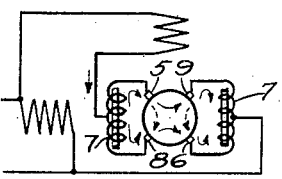
Figure 29:
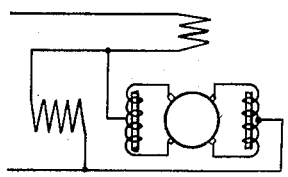
Figure 30:
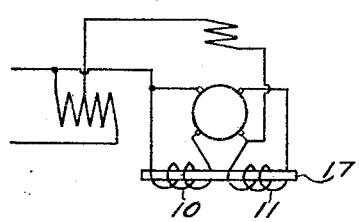
Figure 31:
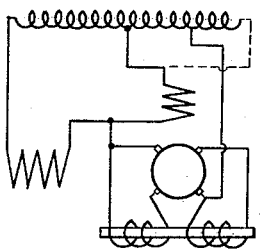
Figure 32:
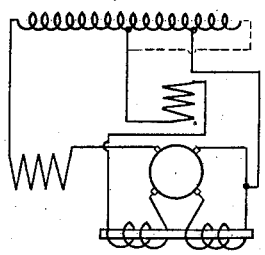
Figure 33:
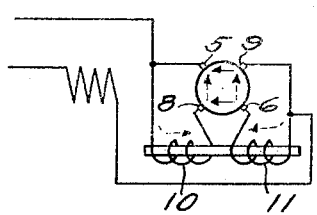

The remaining figures of the drawings illustrate applications of my invention to motors of a doubly-fed type, or motors in which the energy is independently supplied to the stator and the armature circuits. Fig. 11 shows a connection in which a portion 11 of the reactor 7 is inserted in series-circuit relation with the inducing winding 2. The main armature load current for this motor will flow from the brush 9, through the armature winding 4 to the brushes 5 and 6 and therefrom through the portions 10 and 11 of the reactor 7 to the source of current supply. The current for the cross-field winding 2 will flow from the source of supply, through the winding 2, the portion 11 of the reactor 7 to the other conductor for the supply circuit and, at times, through the armature exciting circuit. Fig. 12 illustrates a case in which the cross-field winding and the torque-producing field winding are replaced by an equivalent field winding 16 which is disposed at an angle to the armature work-current circuit. The connections shown in Fig. 13, Fig. 14, Fig. 15, Fig. 17 and Fig. 30 interpose a portion of the cross-field inducing winding 2 in series-circuit relation with the armature, thereby utilizing the same as a transformer for supplying low potential energy to the armature. These connections may be made adjustable and are particularly desirable for power-factor and speed regulation. Fig. 17 to Fig. 23, inclusive, Fig. 25, Fig. 26, Fig. 28 and Fig. 29 illustrate the use of two inductive reactors 7 which perform functions similar to those performed by the corresponding winding 7 hereinbefore described. This arrangement permits the use of more than three armature brushes for conducting the load current in a bipolar machine. The dotted lines shown in Fig. 20 to Fig. 25, inclusive, are for reverse doubly-fed motor connections. The load current for motors employing four load-current conducting brushes is conducted through the armature circuit, as shown by the solid-line arrows in Fig. 28. The armature exciting circuit extends from the brush 5 to 8 and through the reactor 7 to the brush 5, as shown by the dotted-line arrows. Fig. 30 to Fig. 34, inclusive, illustrate the use of reactor parts 10 and 11 which are mutually inductive, being wound on the same core 17, and which correspond, in function, to the similarly numbered portions of the reactor 7 hereinbefore described. Fig. 33 illustrates a motor in which the coil parts 10 and 11 are electrically separated but are mutually inductive and perform the same functions as the corresponding coil parts described in connection with Figs. 1, 2 and 3. In this case, however, both sets of brushes are set at an angle to the magnetic axis of the stator exciting field 2. The load current is conducted from brushes 6 to 8 and 9 to 5, and the exciting current flows through the reactor parts 10 and 11 and the respective brush sets 5 and 8 and 6 and 9. It will be understood that, in this case, all of the brushes are available for both magnetizing and work currents. The portions 10 and 11 of the reactor 7 are wound in opposite directions on the core 12 in order to make the reactor non-inductive to the load current. Fig. 34 illustrates a motor in which an auxiliary electromotive force is applied across the exciting circuit of the armature winding without altering the impedance of the main load-current circuit. An additional coil 18 is connected between intermediate taps 19 and 20 from the respective reactor parts 10 and 11 and is in shunt relation to the supply circuit although it may be dependent upon other conditions.

I do not wish to limit myself to the particular construction and arrangement of parts herein shown but aim, in the appended claims, to cover all modifications which are believed to be within the scope of my invention.

I claim as my invention:

1. In an alternating-current commutator motor, a stator field winding, a rotor having an induced winding and a commutator to which said induced winding is connected and provided with sets of brushes, and mutually-inductive reactors connected to said brushes, said reactors being adapted to oppose the flow of exciting current between certain of said brushes without opposing the flow of load current through said brushes, said reactors having a magnetic circuit adapted to become magnetically saturated when a predetermined voltage exists between certain of said brushes.

2. In an alternating-current commutator motor, a stator having field poles, an armature having a working-current circuit and an exciting-current circuit, a commutator for said armature provided with three or more sets of brushes for each pair of field poles, all of said brushes being adapted to conduct said working current, and an inductive winding interposed between certain of said brushes and adapted to oppose the flow of said exciting current without opposing the flow of said working current, said inductive winding having a magnetic circuit adapted to become magnetically saturated when a predetermined voltage exists between certain of said brushes.

3. In an alternating-current commutator motor having transformer-conduction connections, an armature and a stator, said armature having commutator brushes and connections providing a working circuit and an exciting circuit, and an inductive reactor interposed in said circuits to carry both currents, said reactor being substantially effective only with respect to said exciting current.

4. In an alternating-current commutator motor having transformer-conduction connections, an armature and a stator, said armature having a commutator provided with a plurality of main brush sets adapted to conduct both load and exciting current and an auxiliary brush set adapted to conduct only load current, and an inductive reactor connected in both the load and the exciting circuits and arranged to be effective only in said exciting circuit.

5. In an alternating-current commutator motor, a stator field winding, a rotor having an induced winding and a commutator provided with sets of brushes, a plural-coil inductive device having a single core, the coils of said device carrying both armature working and armature exciting currents, the resultant magnetizing effect of one of the currents in all coils being differential while that of the other current in the same coils is cumulative, and said coils having a magnetic circuit adapted to become magnetically saturated when a predetermined voltage exists between certain of said brushes.

In testimony whereof, I have hereunto subscribed my name this 30th day of Dec. 1916.

RUDOLF E. HELLMUND.